(No Model.)

E. M. HAMILTON.
WIRE CLAMP AND COUPLING.

No. 329,162. Patented Oct. 27, 1885.

Witnesses:

Inventor
Emery M. Hamilton
by J. P. Fitch
his Atty

UNITED STATES PATENT OFFICE.

EMERY M. HAMILTON, OF NEW YORK, N. Y., ASSIGNOR, BY MESNE ASSIGNMENTS, TO LOUIS GOLDSMITH, OF SAME PLACE.

WIRE CLAMP AND COUPLING.

SPECIFICATION forming part of Letters Patent No. 329,162, dated October 27, 1885.

Application filed November 2, 1882. Renewed December 24, 1884. Serial No. 151,'05. (No model.)

*To all whom it may concern:*

Be it known that I, EMERY M. HAMILTON, of the city, county, and State of New York, and a citizen of the United States, have invented a new and useful Improvement in Wire Clamps and Couplings, of which the following is a specification, reference being had to the accompanying drawings, forming part of the same, in which—

Figure 1:
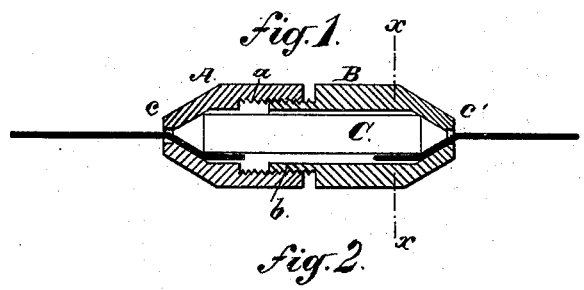
Figure 2:
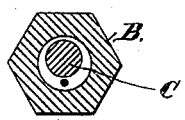
Figure 3:
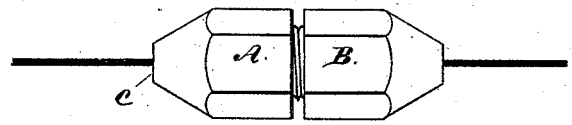

Figure 1 is a longitudinal central section of a wire clamp containing my invention. Fig. 2 is a cross-section of the same on line $x\ x$, Fig. 1; and Fig. 3 is a side view of the same.

My invention relates to a metallic wire-coupling device especially adapted for coupling the ends of wires constituting the conductors of an electric circuit, as in the electric telegraph.

It consists in the combination of devices hereinafter described and claimed.

A and B are two metal thimbles or sleeves, preferably of brass. They are provided, respectively, at one end with screw threads $a$ and $b$, one with a male and the other a female screw-thread, by which they may be united by being screwed together, as shown in the drawings. At the opposite ends are apertures $c$ and $c'$, sufficiently large to admit the ends of the wires to be connected.

C is a metallic cylinder or shaft, which fits loosely into the thimbles where they are put together. It is of sufficient length to fill or nearly fill longitudinally the space within the thimbles. It may be of the same diameter as said space, but preferably a little less, as shown in the drawings. It is preferably provided with tapered or conical ends, as shown, and the interior walls of the outer ends of the thimbles shaped to correspond with the ends of said shaft, so that when the thimbles are screwed together the outer ends of the thimbles will fit down upon both ends of the said cylinder C. The ends of wires being passed into the apertures in the outer ends of the thimbles by screwing the thimbles together, the wires will be clamped firmly between the ends of the cylinder C and interior surfaces of the ends of the thimbles, and thus be coupled.

The advantages of this coupling in simplicity, cheapness, and convenience of operation are obvious. It will be seen that the ends of wires may be coupled or uncoupled at one operation by turning a single screw.

Either of the thimbles and one end of the shaft C constitute a clamping device, which may be employed to clamp wires to the binding-posts of electrical instruments.

For the coupling of fine wires that are easily flexed the ends of the cylinder C and the opposing interior surfaces of the ends of the thimbles may be square, or at right angles with the axis of the said cylinder, or they may be spherical or rounded instead of conical. The latter form, as shown, however, I regard as preferable.

What I claim as my invention, and desire to secure by Letters Patent, is—

The described metallic wire coupling, consisting of the thimbles A and B, provided with screw-threads $a$ and $b$, and united together thereby, and with apertures $c\ c'$, and the solid cylinder or shaft C, placed loosely within said thimbles, all constructed and combined as and for the purpose described.

EMERY M. HAMILTON.

In presence of—
GEO. W. BEEBEE,
A. G. N. VERMILYA.